United States Patent

Vallance et al.

[11] Patent Number: 6,109,234
[45] Date of Patent: Aug. 29, 2000

[54] CYLINDER HEAD INTAKE SYSTEM

[75] Inventors: James Kirkland Vallance, Northville; Robert William Page, South Lyon; Lyn Louis Vandenabeele, St. Clair Shores; David Hollis Barber, Allen Park, all of Mich.

[73] Assignee: Ford Global Technologies, Inc., Dearborn, Mich.

[21] Appl. No.: 09/174,237

[22] Filed: Oct. 16, 1998

[51] Int. Cl.[7] .................................................. F02B 31/08
[52] U.S. Cl. ............................................................ 123/308
[58] Field of Search ............................................ 123/308

[56] References Cited

U.S. PATENT DOCUMENTS

| | | | |
|---|---|---|---|
| 3,020,896 | 2/1962 | Meurer et al. | 123/308 |
| 4,748,950 | 6/1988 | Okumura et al. | 123/308 |
| 5,477,823 | 12/1995 | Uchida | 123/308 |
| 5,479,888 | 1/1996 | Morimoto et al. | 123/262 |
| 5,479,889 | 1/1996 | Sato et al. | 123/308 |
| 5,603,299 | 2/1997 | Yuzuriha et al. | 123/308 |
| 5,676,107 | 10/1997 | Yuzuriha et al. | 123/308 |

FOREIGN PATENT DOCUMENTS 0634571   1/1995   European Pat. Off. .............. 123/308

*Primary Examiner*—Andrew M. Dolinar

[57] ABSTRACT

An internal combustion engine cylinder head includes a pent roof (15) closing off a top of an engine cylinder (14) and first and second inclined surfaces (15a, 15b) intersecting an apex region (15c) of the pent roof. First and second air intake ports (20, 22) are formed in the pent roof surfaces and about respective first and second spiral axes (S1, S2) having respective radii (R1, R2, etc.) that change in magnitude and elevation as each air intake port approaches respective port entrances (20a, 22a) to the cylinder in a manner to provide air flows with in-cylinder air swirl in the same direction about the longitudinal axis of the cylinder.

6 Claims, 2 Drawing Sheets

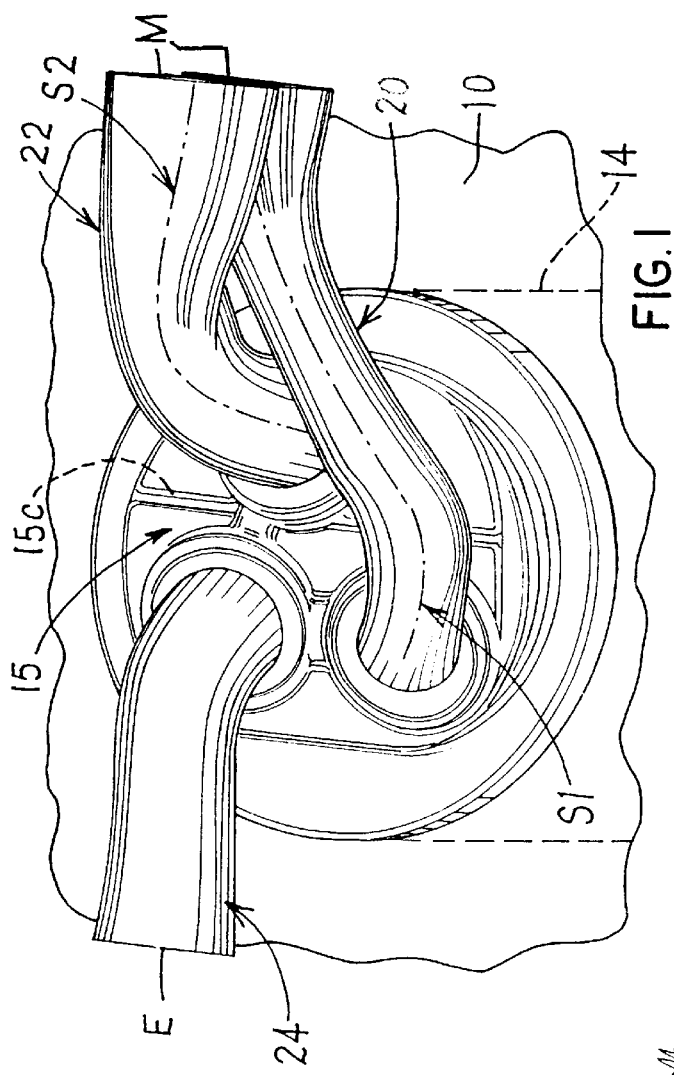
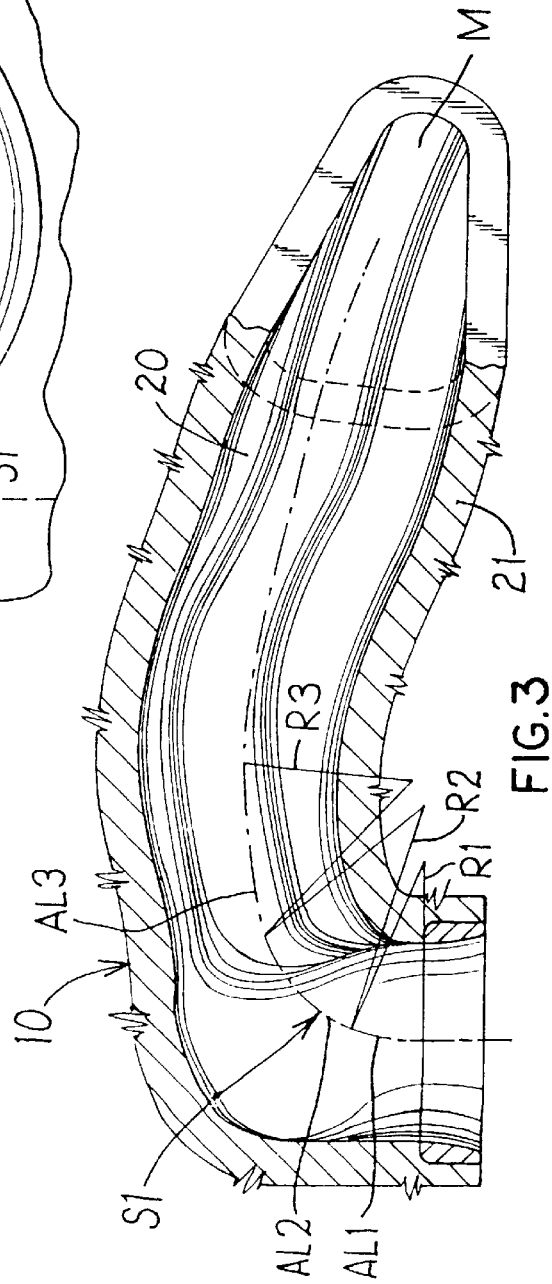

CYLINDER HEAD INTAKE SYSTEM

BACKGROUND OF THE INVENTION

1. Field of the Invention

The present invention relates to an air intake port system for an internal combustion engine cylinder head.

2. Background Information

Internal combustion engines, such as gasoline automobile engines, have been provided with air intake systems having multiple air intake ports adapted to generate high in-cylinder air swirl in attempts to improve combustion, fuel economy, and emissions. Such air intake systems, however, generally exhibit lower air mass flow efficiency as a result of increased air flow resistance attributable to the particular air intake port designs used heretofore. In particular, high in-cylinder air swirl traditionally has been generated by bending and twisting of the air intake ports to effect a generally helical flow of air about the axis of at least one of the intake valves. However, loss of in-cylinder swirl motion at lower power regimes of engine operation, such as at engine idling, has been so severe in some situations as to require a port deactivating device to deactivate one of the air intake ports in order to maintain some in-cylinder swirl. These port deactivation devices typically reduce flow efficiency even further.

Objects of the present invention are to provide an internal combustion engine cylinder head with one or more air intake ports arranged and configured in a manner to overcome the above-discussed shortcomings of previous air intake port systems and provide effective in-cylinder swirl and air mass flow rates at all regimes of engine operations such that there is no need for a port deactivating device.

SUMMARY OF THE INVENTION

In accordance with an aspect of the present invention, an internal combustion engine cylinder head comprises at least one air intake port for supplying combustion air to a cylinder wherein the air intake port is formed proximate a port entrance to the cylinder about a spiral axis comprising a series of incremental arc lengths having respective radii that change in magnitude and elevation as the air intake port approaches the port entrance in a manner to provide air flow with in-cylinder swirl about the longitudinal axis of the cylinder.

In accordance with another aspect of the present invention, an internal combustion engine cylinder head includes a pent roof closing off a top of a cylinder and having first and second inclined surfaces intersecting an apex region of the pent roof. First and second air intake ports include respective port entrances opening to the cylinder through the respective first and second pent roof surfaces. The air intake ports are formed about respective spiral axes configured to provide tandem air flows in the cylinder with in-cylinder swirl in the same direction about the longitudinal axis thereof. The first and second entrance ports preferably are so arranged on the pent roof surfaces as to provide an aggregate air flow mass rate that exceeds the sum of the individual air flow mass rates of each entrance port operated alone.

BRIEF DESCRIPTION OF THE DRAWINGS

FIG. 1 is a perspective view of air intake ports and an exhaust port of an internal combustion engine cylinder head in accordance with aspects of the invention.

FIG. 3 is a longitudinal sectional view of the first air intake port illustrating a spiral axis about which the port is formed.

DESCRIPTION OF PREFERRED EMBODIMENT

Figure 2:
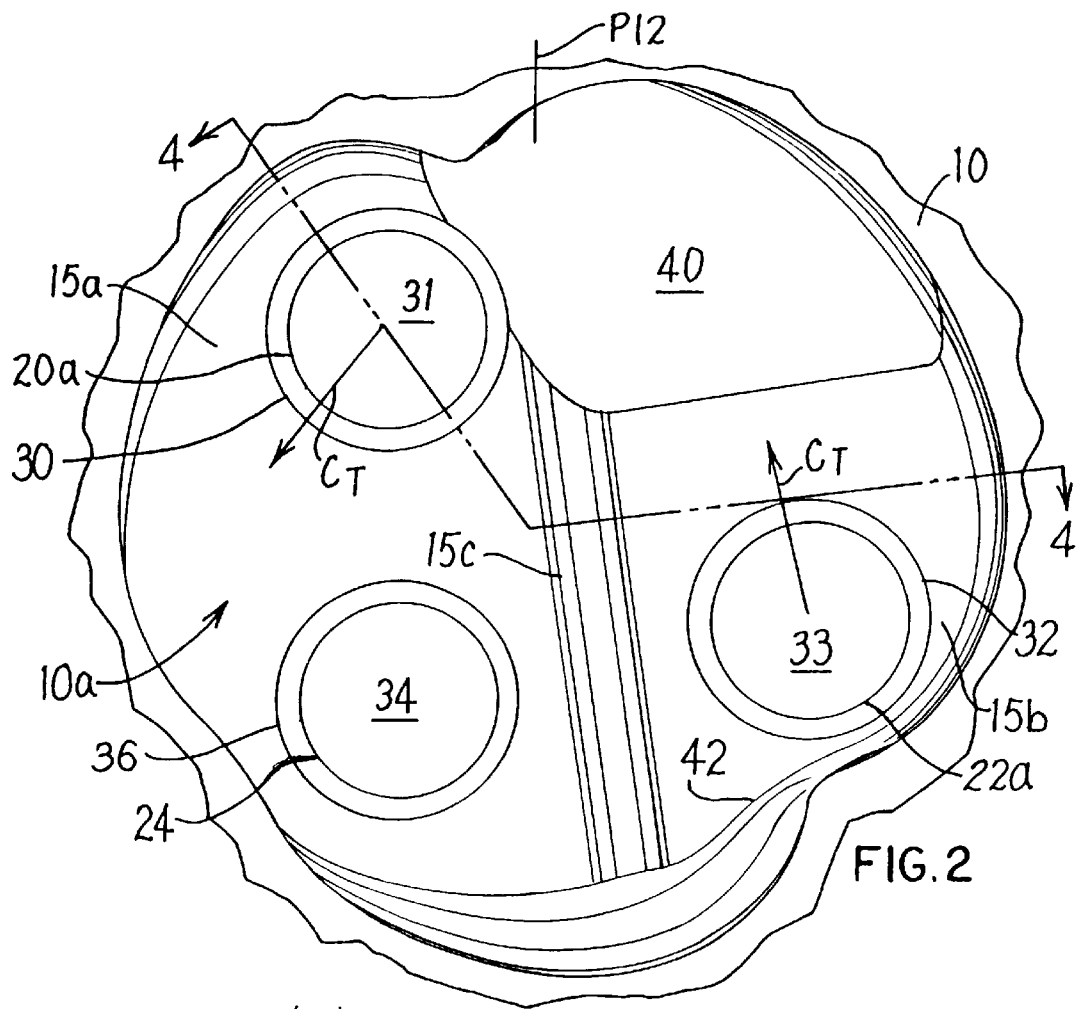
FIG. 2 is a perspective view of an interior pent roof of the cylinder head closing off the top of a cylinder and showing the positions of the air intake ports and exhaust port as well as air directing masks associated with the air intake ports.

Referring to FIGS. 1 and 2, an internal combustion engine cylinder head 10 in accordance with aspects of the present invention is partially shown. The cylinder head 10 is adapted to be mounted on a cylinder block 12 having a plurality of cylinders, one such cylinder 14 being shown in FIGS. 1 and 4 defined about a central longitudinal cylinder axis A.

For each such cylinder, the cylinder head 10 includes an interior surface 10a, FIG. 2, overlying the top of the cylinder to form a combustion chamber above a piston (not shown) residing in each cylinder. The interior surface 10a is shown in FIG. 2 for purposes of illustration as a pent roof 15 closing off a top of cylinder 14. The pent roof includes first and second inclined surfaces 15a, 15b intersecting a radiused apex region 15c of the pent roof. In an exemplary embodiment of the invention, the first and second pent roof surfaces 15a, 15b define an included angle of 150 degrees, more generally an included angle in the range of about 130 to about 160 degrees. For example only, surfaces 15a, 15b can be oriented at angles of 10 degrees and 25 degrees, respectively, relative to a plane perpendicular to the central longitudinal cylinder axis A. A threaded hole (not shown) is provided in the pent roof surface 15a or 15b to receive a spark plug or glow plug in customary manner.

Figure 4:
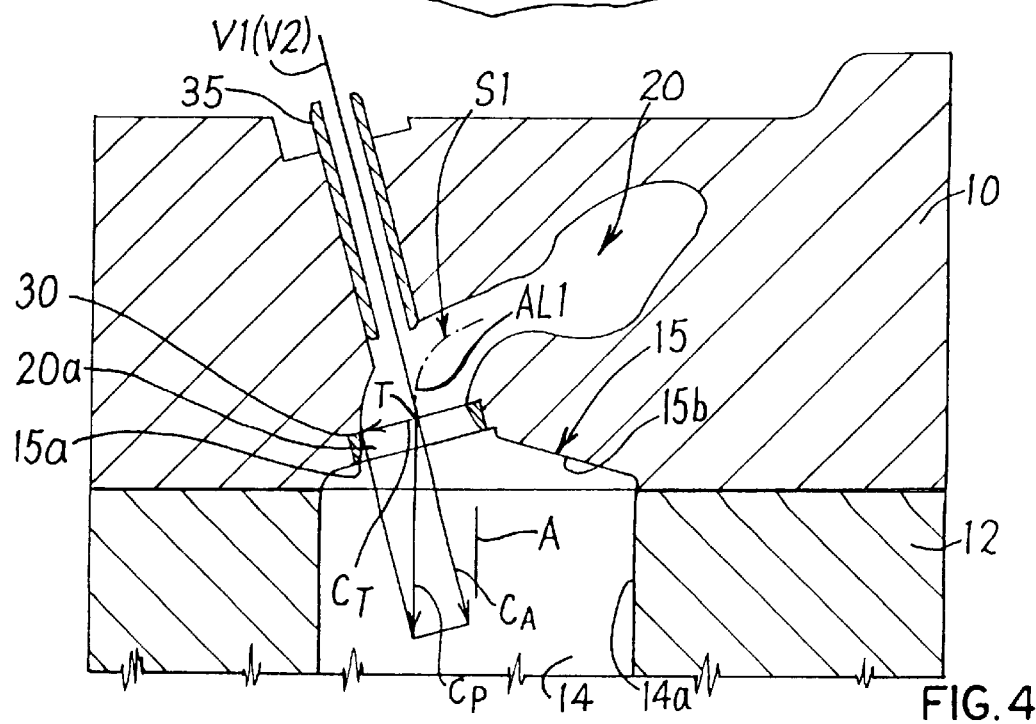
FIG. 4 is a sectional view taken along lines 4—4 of the pent roof of FIG. 2.

The cylinder head 10 also includes for each cylinder 14 a first air intake port 20 and a second air intake port 22 that are communicated to an air manifold of the internal combustion engine and designated schematically as M in FIGS. 1 and 3. The air intake ports 20, 22 typically are formed as passages within tubular walls as illustrated in FIG. 1 cast integrally with or attached as one or more separate components to the cylinder head 10. FIG. 4 illustrates the air intake port 20 as a passage in a simulated cylinder head body for sake of convenience.

The first and second air intake ports 20, 22 extend from the manifold M to respective port entrances 20a, 22a in the cylinder head 10 to discharge respective incoming air flows into the cylinder. The port entrances 20a, 22a are formed in the first and second inclined surfaces 15a, 15b of the pent roof 15, FIG. 2, and include respective valve seats 30, 32 for cooperating with conventional cam shaft-actuated, spring-biased poppet intake valves, only the valve heads 31, 33 being illustrated in FIG. 2, that control intake air flow in conventional manner. The intake valves reciprocate within conventional valve guides, one valve guide 35 being shown in FIG. 4 for air intake port 20. The intake valves have valve axes V1, V2 which are oriented approximately 90 degrees relative to the respective pent roof surfaces 15a, 15b. The air intake ports 20, 22 conduct combustion air alone or mixed with fuel to the cylinder 14. An exhaust port 24 is located in the pent roof surface 15a and is communicated to an exhaust manifold of the internal combustion engine designated schematically as E in FIG. 1, as controlled by a conventional cam shaft-actuated, spring-biased poppet valve, only the valve head 34 being illustrated in FIG. 2, and an associated exhaust valve seat 36.

The air intake ports 20, 22 are defined about respective spiral axes Si, S2 at least proximate the respective port entrances 20a, 22a. Although the spiral axes SI, S2 typically have different configurations as is apparent from FIG. 1, each spiral axis comprises a series of connected incremental arc lengths such as AL1, AL2, AL3, etc. illustrated for intake port 20 in FIG. 3 having respective radii R1, R2, R3, etc. that change in magnitude and elevation and having different arc lengths, as each intake port 20, 22 approaches its respective port entrance 20a, 20b to the cylinder 14 so as to provide a gradual, smooth, generally uniform directed flow of intake air to the port entrances to improve air mass flow efficiency. Each spiral axis S1, S2 includes an entry arc length such as AL1 illustrated for intake port 20 in FIG. 3 that terminates at each port entrance 20a, 22a in a configuration to provide such a sudden (e.g. near instantaneous) change in incoming air flow direction that a component or vector of air flow motion in the cylinder 14 is established in a direction that produces in-cylinder swirl about the longitudinal cylinder axis A. For example, referring to FIG. 4, each entry arc length AL1 resides in a plane containing the longitudinal cylinder axis A and the longitudinal axis V1, V2 of the respective intake valves with the plane being perpendicular to a plane normal to the cylinder axis A. The terminus or end T of each entry arc length AL1 at each port entrance 20a, 22a is tangent to a respective intake valve axis V1, V2 so as to provide the aforementioned sudden change in direction of incoming air flow discharged from each port entrance 20a, 22a into the cylinder 14 effective, together with the respective inclined pent roof surface 15a, 15b to establish a primary air flow direction $C_P$ with components or vectors $C_T$ and $C_A$ of motion, the component or vector $C_T$ being in the same direction nearly tangent to the cylindrical wall 14a of the cylinder for each incoming air flow. The port entrances 20a, 22a thereby discharge concurrent tandem incoming air flows into cylinder 14 with in-cylinder swirl in the same direction (e.g. clockwise or counterclockwise) about the cylinder axis A.

The spiral axes S1, S2 of the air intake ports 20, 22 begin at the respective entry arc lengths AL1 at the port entrances 20a, 22a and progress toward the manifold M via the aforementioned series of incremental arc lengths AL2, AL2, AL3, etc. that change in radii and elevation as they progress toward the manifold M. The radii and elevations of the incremental arc lengths AL2, AL3, etc. are selected to provide a gradual, smooth spiral flow path for intake air flowing from the manifold to the intake ports 20, 22. The magnitudes and elevations of the radii of these incremental arc lengths AL2, AL3, etc. can be determined empirically to provide smooth air flow transitions in the intake ports within available engine space. The spiral axes S1, S2 do not need to extend completely to the manifold M in the practice of the invention since more or less straight air flow paths typically can be provided remote from the port entrances 20a, 22a as the air intake ports approach the manifold M. The cross-sectional shape of the air intake ports 20, 22 may vary from near circular proximate the cylinder head to somewhat D-shaped proximate the manifold M as necessary to accommodate the other air intake port and available engine space requirements.

The first and second air intake ports 20, 22 preferably are so arranged on opposite surfaces 15a, 15b of the pent roof 15 as to provide an aggregate air flow mass rate that exceeds the sum of the individual air flow mass rates of each first and second entrance port if operated alone. For purposes of illustration and not limitation, the first air intake port 20 is located 30 degrees counterclockwise from the 12 o'clock position P12 of FIG. 2, and the second port 22 is located 120 degrees clockwise from the same position P12 to this end. This angular spacing or displacement of the intake ports 20, 22 has been found to introduce the incoming air flow from the second air intake port 22 into a region of reduced pressure of incoming air flow from the first air intake port 20 disposed upstream thereof such that a suction effect is exerted on the second air intake port 22 to provide the above noted increased air flow mass rate.

Referring to FIG. 2, the pent roof 15 of the cylinder head is shown including first and second air directing masks 40, 42 proximate the respective first and second air intake ports 20, 22 to assist in directing air flows in the same swirl direction in the cylinder 14. The first mask 40 inclines from the pent roof surface 15b toward the pent roof surface 15a. The second mask 42 comprises a shallow wrap or curtain extending downwardly at an edge of the pent roof surface 15b. The masks 40, 42 prevent the air flows issuing from ports 20, 22 from moving in a direction opposite to the desired in-cylinder swirl direction at low intake valve lifts. This air directing action of the masks 40, 42 reduces the kinetic energy lost by the incoming air flows as they try to reverse the in-cylinder swirl direction as the intake valves reach higher valve lifts. The air directing masks thereby provide an increase in swirl in the cylinder 14 without a reduction in air mass flow rate from the air intake ports 20, 22.

While the invention is described above in terms of specific embodiments thereof, it is not intended to be limited thereto but rather only to the extent set forth hereafter in the following claims.

We claim:

1. An internal combustion engine cylinder head, comprising:
   a pent roof closing off a top of a cylinder having a longitudinal axis and including first and second inclined surfaces intersecting an apex region of said pent roof, first and second air intake ports having respective first and second port entrances opening to said cylinder through the respective first and second inclined surfaces, said first and second air intake ports being formed about respective first and second spiral axes configured to provide tandem air flows in said cylinder with in-cylinder swirl in the same direction about said longitudinal axis of said cylinder.

2. The cylinder head of claim 1 wherein said first and second spiral axes comprise respective first and second series of incremental arc lengths having radii that change in magnitude and elevation as said first and second air intake ports approach the respective first and second port entrances.

3. The cylinder head of claim 2 wherein said first and second spiral axes include respective first and second entry arc lengths terminating at said respective first and second entrance ports in a manner providing said tandem air flows with respective components of motion in directions producing said in-cylinder swirl.

4. The cylinder head of claim 3 wherein said first and second entry arc lengths each have a terminus at the respective first and second port entrances that is tangent to a longitudinal axis of a respective first and second intake valve.

5. The cylinder head of claim 1 wherein said first and second air intake ports are so arranged on said first and second inclined surfaces as to provide an aggregate air flow mass rate that exceeds the sum of the individual air flow mass rates of each respective first and second air intake port operated alone.

6. The cylinder head of claim 1 further including first and second air directing masks on said pent roof proximate the respective first and second port entrances to assist in directing air flows in said same direction.

* * * * *